United States Patent [19]

Rembold et al.

[11] Patent Number: 4,674,451
[45] Date of Patent: Jun. 23, 1987

[54] VALVE CONTROL ARRANGEMENT FOR INTERNAL COMBUSTION ENGINES WITH RECIPROCATING PISTONS

[75] Inventors: Helmut Rembold, Stuttgart; Manfred Ruoff, Moeglingen; Walter Teegen, Waiblingen, all of Fed. Rep. of Germany

[73] Assignee: Robert Bosch GmbH, Stuttgart, Fed. Rep. of Germany

[21] Appl. No.: 807,433

[22] Filed: Dec. 9, 1985

[30] Foreign Application Priority Data

Mar. 30, 1985 [DE] Fed. Rep. of Germany ....... 3511820

[51] Int. Cl.$^4$ .......................... F01L 1/24; F02D 13/00
[52] U.S. Cl. .............................. 123/90.16; 123/90.12; 123/198 F
[58] Field of Search ............. 123/198 F, 90.12, 90.16, 123/90.14, 90.11

[56] References Cited

U.S. PATENT DOCUMENTS

| | | | |
|---|---|---|---|
| 2,019,252 | 10/1935 | Cottingham | 123/90.16 |
| 3,439,661 | 4/1969 | Weiler | 123/90.16 |
| 3,817,228 | 6/1974 | Bywater | 123/90.12 |
| 4,153,016 | 5/1979 | Hausknecht | 123/90.12 |
| 4,188,933 | 2/1980 | Iizuka | 123/198 F |
| 4,278,233 | 7/1981 | Lurner et al. | 123/90.12 |
| 4,347,812 | 9/1982 | Kosuda et al. | 123/90.16 |
| 4,466,390 | 8/1984 | Babitzka et al. | 123/90.12 |

FOREIGN PATENT DOCUMENTS

| | | | |
|---|---|---|---|
| 2926327 | 1/1981 | Fed. Rep. of Germany ... | 123/90.16 |
| 3135650 | 3/1983 | Fed. Rep. of Germany . | |
| 25020 | 2/1984 | Japan | 123/198 F |

Primary Examiner—Ira S. Lazarus
Attorney, Agent, or Firm—Michael J. Striker

[57] ABSTRACT

A valve control arrangement for an internal combustion engine with reciprocating pistons, comprises a combustion chamber valve, a driving cam of the combustion chamber valve, a movement transmission group arranged between the combustion chamber valve and the driving cam and having a pressure chamber which is fillable with a pressure medium and unloadable from the pressure medium, an unloading conduit through which the pressure chamber is unloaded, and electrically controlled blocking valve arranged in the unloading conduit for blocking and releasing the unloading conduit and therefore coupling or uncoupling the combustion chamber valve relative to the driving cam, the blocking valve being formed as electromagnetically controlled 2/2 directional control valve.

24 Claims, 9 Drawing Figures

VALVE CONTROL ARRANGEMENT FOR INTERNAL COMBUSTION ENGINES WITH RECIPROCATING PISTONS

BACKGROUND OF THE INVENTION

The present invention relates to a valve control arrangement for internal combustion engines with reciprocating pistons.

Arrangements of the above mentioned general type are known in the art. One of such arrangements is disclosed in the DE-OS No. 3,135,650 and it has a blocking valve provided with a valve slider whose end side is loaded by pressure in a pressure medium chamber. The valve slider has a clamping lug which extends between an anvil and a clamping plunger. A clamping plunger carries at its end a column a piezo discs which cover one another and can be provided with a control voltage. When there is no control voltage, the clamping plunger presses the clamping lock of the valve slider against the anvil and clamps the same in the closing position of the valve slider. When a control voltage is applied to the column, it shrinks and releases the clamping lug. Under the pressure of the pressure medium chamber, the valve slider opens and releases the unloading conduit to pressure medium return. The disadvantage of such a piezo electric control member lies in the relatively high control voltage of approximately 700 V.

SUMMARY OF THE INVENTION

Accordingly, it is an object of the present invention to provide a valve control arrangement for internal combustion engines with reciprocating pistons of the above mentioned general type, which avoids the disadvantages of the prior art and more particularly can be driven directly from board voltage of 12 V available in the vehicle.

In keeping with these objects and with others which will become apparent hereinafter, one feature of the present invention resides, briefly stated, in that the above mentioned blocking valve of the valve control arrangement is formed as an electromagnetically controlled 2/2 directional control valve.

For reducing the control power, the inventive 2/2 directional control valve operates with compression pressure support from the pressure medium chamber and has low flow cross section. This results in small required electromagnetic actuating force, that allows a small and short-stroke construction of the electromagnet. Thereby the inductivity is relatively low and extremely switching times are obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
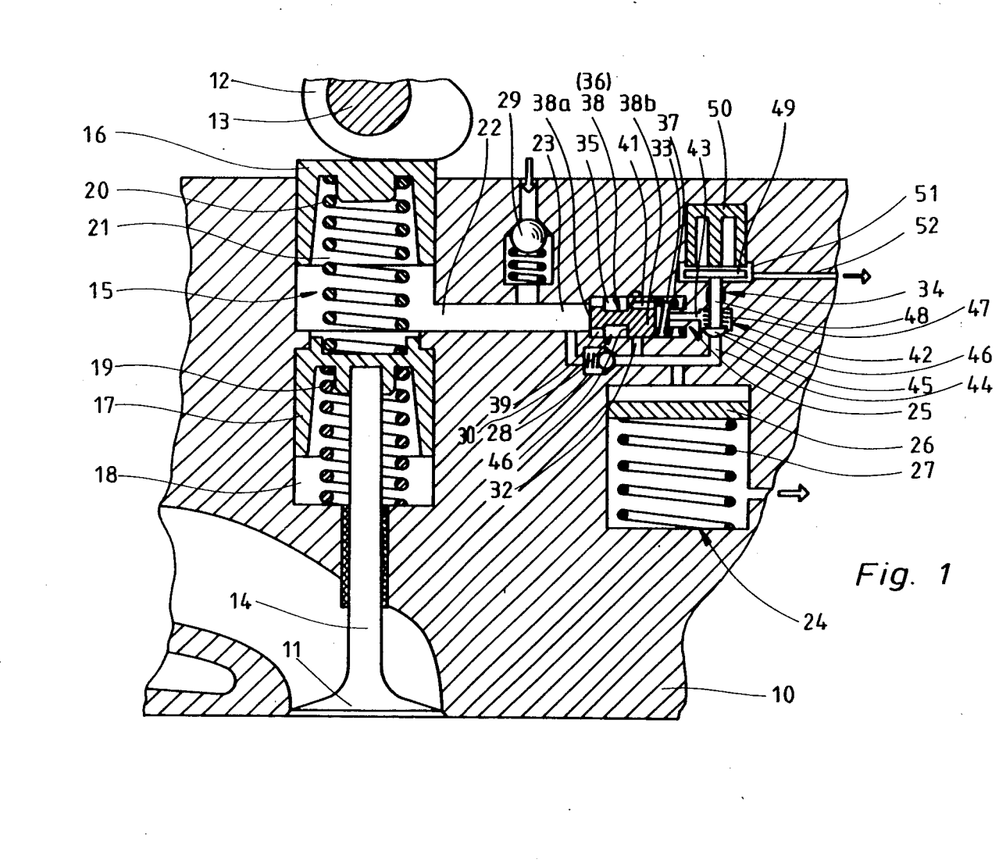
FIG. 1 is view showing a longitudinal section of a valve control arrangement arranged in a cylinder head of an internal combustion engine, in accordance with the present invention.

FIG. 1 shows a longitudinal section of a cylinder head 10 and an inlet valve 11 in an internal combustion with reciprocating pistons.

The inlet valve 11 is controlled by a driving cam 12 which is seated on a cam shaft 13 of the internal combustion engine. A mechanically-hydraulic movement transmission group 15 of the valve control arrangement is located between the driving cam 12 and a valve plunger 14.

This group 15 which s shown schematically has an upper piston 16 and a lower piston 17 which are arranged axially displaceably in a common housing chamber 18 that is coaxial to the valve plunger 14. The lower piston 17 is loaded by spring 19 which supports against the bottom of the housing chamber 18. The upper piston 16 abuts through a spring 20 which is supported on the lower piston 17, against the driving cam 12 of the cam shaft 13. A pressure chamber 21 is limited by the upper and lower pistons 16 and 17 and can be filled or emptied via an opening 22 which extends from the pressure chamber 21. A portion of the opening serves as an unloading conduit 23 which leads to a spring accumulator 24 at which a blocking valve formed as an electromagnetically controlled 2/2 directional valve 25 is arranged.

When 2/2 directional control valve 25 is blocked, the fluid-filled pressure chamber 21 forms a hydraulic cushion between the upper piston 16 and the lower 17, so that the displacing movement of the upper piston 16, which is released by the driving cam 12, is transmitted directly to the lower piston 17 and from the latter to the valve plunger 14. When the 2/2 directional control valve 25 is opened, the liquid is displaced from the pressure chamber 21 either by the downward movement of the upper piston 16, or by the upward movement of the lower piston 17 in a spring accumulator 24 caused by a spring 19. In the spring accumulator 24, a pressure piston 26 is tensioned against the force of a return spring 27. With the opened 2/2 directional control valve 25, the valve plunger 14 is uncoupled from the driving movement of the driving cam 12 and the inlet valve 11 closes regardless of the instantaneous position of the driving cam 12. When the upper pistion 16 is again moved back to its upper basic position shown in FIG. 1, the fluid flows from the spring accumulator 24 via the open 2/2 directional valve 25 into the pressure chamber 21.

For preventing opening of the 2/2 directional control valve 25 during filling of the pressure chamber 21, a check valve 28 is provided. The check valve bridges the 2/2 directional control valve 25 and is directly connected with the valve inlet and the valve outlet. The check 28 is arranged so that its locking direction leads from the pressure chamber 21 to the spring accumulator 24. Leakage losses in fluid volumes which are enclosed and alternately reciprocates between the pressure chamber 21 and the pressure accumulator 24 are replaced by the motor pressure oil supply via a further check valve 29 which has a through flow direction toward the opening 22. The connections to a not-shown supply accumulator are identified in FIG. 1 symbolically by flow arrows.

The electromagnetically controlled 2/2 directional control valve 25 in FIG. 1 has a hydraulically actuated longitudinal displacement valve 30 with a control chamber 33, and an electromagnetic control valve 34 connected with the control chamber 33. The longitudinal displacement valve 30 has a housing opening 35 which is concentric to a valve inlet 31. A control piston 36 is guided axially displaceably in the housing opening 35 against the force of a valve closing spring 37 arranged in the control chamber 33. The control piston 36 is formed as a tandem piston 38. Its front piston part 38a which faces toward the valve inlet is provided with axial throughgoing openings 39, and its rear piston part 38b carries a control edge 40 which cooperates with a valve outlet 32 extending radially relative to the housing opening 35. A throttle 41 is arranged in the rear piston part 38b of the tandem piston 38. The throttle 41 connects the control chamber 33 with the valve inlet 31 via axial throughgoing openings 39.

The electromagnetic control valve 34 is formed as a seat valve 42. Its valve inlet 43 is connected with the control chamber 33 of the longitudinal displacement valve 30 and its valve outlet 42 is connected with the valve outlet 32 of the longitudinal control valve 30, and at the outlet side of the longitudinal displacement valve 30 with the unloading conduit 23. The seat valve 42 has a valve member 45 which is held by a closing spring 47 on a valve seat 46 which coaxially surrounds the valve outlet 44. The valve member 45 is coupled via an actuating rod 48 with an armature 49 of an electromagnet 50. When the magnet is actuated, the seat valve 42 opens.

The operation of the above described 2/2 directional control valve 25 is as follows:

When the seat valve 42 is closed, the control chamber 33 is connected via the axial throughgoing openigns 39 and the throttle 41 with the pressure chamber 21. The valve closing spring 37 in the control chamber 33 holds the tandem piston 38 in its closed position. When the electromagnet 50 is actuated, the armature 49 is pulled and the valve member 45 is lifted from the valve seat 46. The seat valve 42 is opened. The pressure in the control chamber 33 of the longitudinal displacement valve 30 is built in shock-like manner. Since the flow cross section of the seat valve 42 is considerably greater than the cross section of the throttle 41, the total pressure on the control or tandem piston 38 falls between the pressure chamber 21 and the spring accumulator 24. The resulting pressure force moves the tandem piston 38 very fast to the right. The control edge 40 releases the valve outlet 32 toward the spring accumulator 24. When pressure equilibrium is reached between the pressure chamber 21 and the spring accumulator 24, the tandem piston 38 is brough again to its closed position. If this must be performed with the closed seat valve 42, the throttle 41 must be dimensioned so that with the available spring force of the valve closing member 37 the tandem piston 38 is closed only before beginning of the next working cycle. Leakage losses which take place in the seat valve 42 into the guiding opening for the actuating rod 48 flow into an armature chamber 51 which surrounds the armature 49 and from there flows back via a return opening 52 to the supply accumulator.

Figure 2:
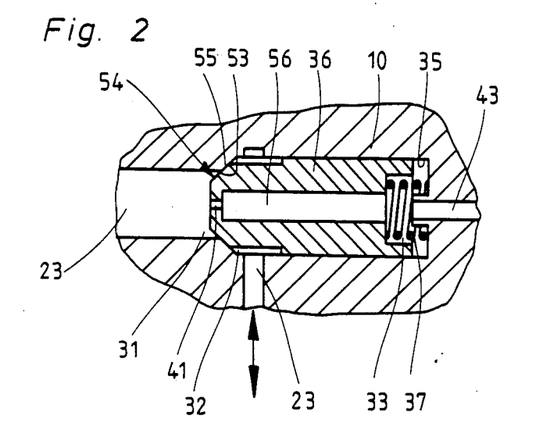
FIG. 2 is a view showing a fragment of a longitudinal section of a 2/2 directional valve of the inventive control arrangement shown in FIG. 1, in accordance with another embodiment of the invention.

In the 2/2 directional control vavle 25 in accordance with the embodiment shown in FIG. 2, the control piston 36 which is axially displaceable in the housing opening 35 is formed at its end side as a valve member 53 of a seat valve 54 which cooperates with a valve seat 55 arranged concentrically to the valve inlet 31. The throttle 41 is again provided between the control chamber which accommodates the valve closing spring 37 and the valve inlet 31. The throttle 41 opens into an axial blind hole 56 which extends from the control chamber 33 and is provided in the control piston 36. In other aspects, the 2/2 directional control valve 25 of FIG. 2 is formed identically to that of FIG. 1. Therefore, the same structural parts are identified with the same reference numerals. In particular, the valve inlet 43 of the control valve 34 is also connected with the control chamber 33, identically to FIG. 1.

Figure 3:
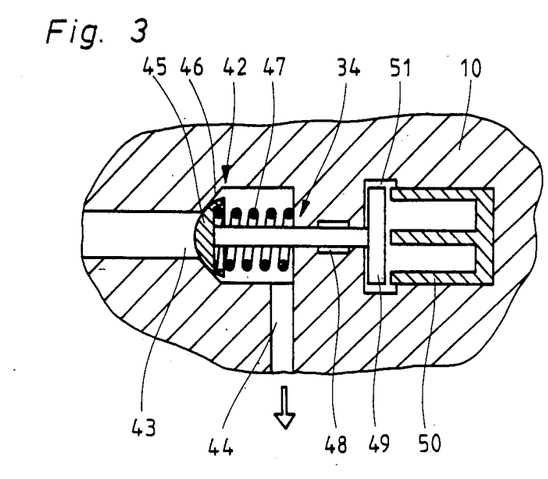
FIG. 3 is a view showing a longitudinal section of an electromagnet control valve in 2/2 directional control valve of the valve arrangement of FIG. 1, in accordance with still another embodiment of the invention.

The 2/2 control valve 25 in accordance with the embodiment shown in FIG. 3 differs from the valves of FIGS. 1 and 2 only by the control valve 34. In the control valve 34 in accordance with the embodiment of FIG. 3, the valve seat 46 which cooperates with the valve member 35 is arranged coaxially to the valve inlet 43 which is connected with the control chamber 33 of the longitudinal displacement valve 30. The electromagnet 50 which actuates the valve member 45 against the return force of the closing spring 46 is formed axially on the seat member 34. The valve outlet 44 is connected not with the valve outlet 32 of the longitudinal displacement valve 30 or with the unloading conduit 23 as in FIG. 1, but instead directly with the pressureless supply accumulator. It is thereby guaranteed that in addition to leakage quantity, the fluid quantity which discharges via the seat valve 34 must be replaced during the return stroke from the supply accumulator, that can be advisable from the thermal grounds. In other aspects, the seat valve 34 is formed as in FIG. 1, therefore the same structural parts are identified with the same reference numerals.

Figure 4:
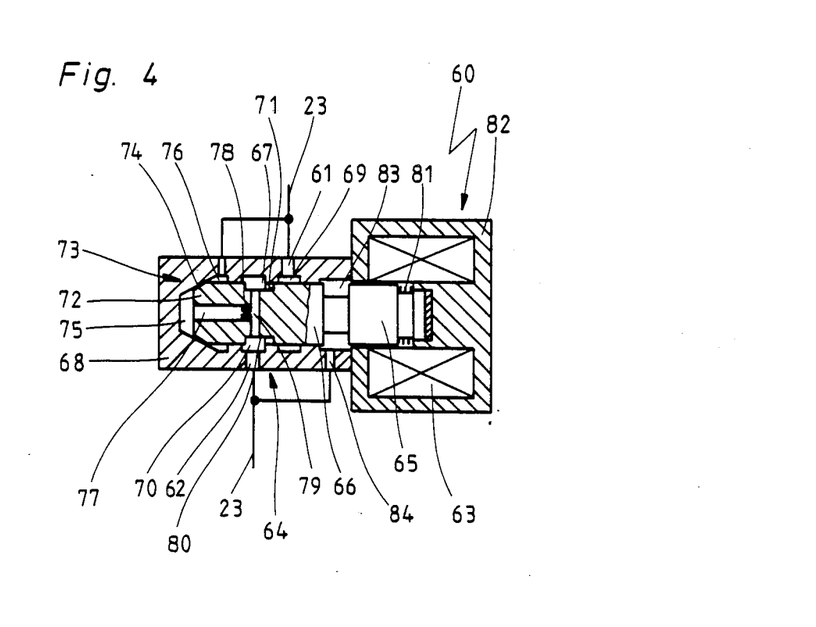
FIG. 4 is a longitudinal section of a 2/2 directional control valve in accordance with a further embodiment of the invention.

A 2/2 directional control valve 60 shown in FIG. 4 can be provided instead of the 2/2 directional control valve 25 in FIG. 1 at the same location in the unloading conduit 23. The valve inlet 61 is connected with the pressure chamber 21 and the valve outlet 62 is connected with the spring accumulator 24. The 2/2 directional control valve 60 is formed as a longitudinal displacement valve 64 actuated by an electromagnet 63. Its control slider 66 which is coupled with an armature 65 of the electromagnet 63 is axially displaceable in a housing opening 67. Two ring shaped grooves 69 and 70 which surround the control slider 66 are arranged in a housing 68. They are connected with the valve inlet 61 and the valve outlet 62 which are formed as radial openings in the housing 68. The control slider 66 carries in a known manner a ring shaped control groove 80 which forms a groove flank of a control edge 71 cooperating with the annular groove 69 which is connected with the valve inlet 62.

The control slider 66 is formed at its end side as a valve member 72 of a seat valve 73 which cooperates with a valve seat 74. The valve seat 74 separates an outlet chamber 75 arranged before the end side of the control slider 66 and an inlet chamber 76 connected with the valve inlet 61 of the seat valve 73. The outlet chamber 75 is connected with the annular groove 70 and thereby with the valve 62 via an axially open puncture opening 77 in which a throttle 78 is arranged and in which a transverse opening 78 in the control slider 67 is open. The valve member 72 is pressed by a return spring 81 in the case of non-actuated electromagnet 63, against the valve seat 74. The return spring 81 is supported on the armature 65 of the axially arranged electromagnet 63 and against a magnet housing 82. A ring shaped outer groove 83 passes in the control slider 66 between the control slider 66 and the anchor 65 which is of one piece with the same. The outer groove 83 is connected via an opening 84 in the housing 68 with the valve outlet 62.

Figure 5:
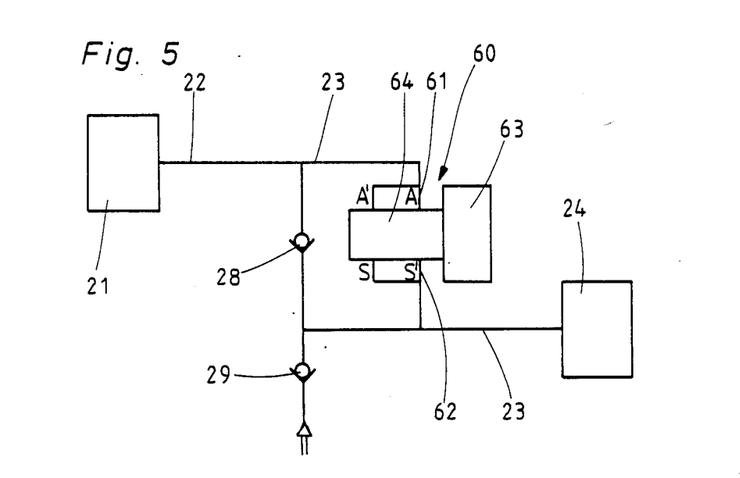
FIG. 5 is a view showing a switching diagram of the hydraulic connections of the 2/2 directional control valve of FIG. 4 inside the valve control arrangement of the invention.

The hydraulic connection of the above described 2/2 directional control valve 60 in the valve control arrangement is shown in FIG. 5. The pressure chamber 21 is connected via the opening 22 and the unloading conduit 23 with the spring accumulator 24. The 2/2 directional control valve 60 is arranged in the unloading conduit 23 and bridged by the check valve 28. In contrast to FIG. 1, the check valve 29 is connected in series with the check valve 28. This has the advantage that the check valve 29 can be used in the internal combustion engine having several valves, with respective one valve control arrangement only once.

The operation of the electromagnetically controlled 2/2 directional control valve 60 shown in FIG. 4 is as follows:

When the electromagnet 13 is not supplied with current, the 2/2 directional control valve 60 assumes the position shown in FIG. 4. Both the longitudinal displacement valve 64 and the seat valve 73 is closed. The pressure of the pressure chamber 21 takes place in the valve inlet 61 and thereby in the ring shaped chamber 69 and in the inlet chamber 76 of the seat valve 73. The accumulator pressure takes place in the valve outlet 62 and thereby in the ring shaped chamber 70, in the control groove 80 and in the outer groove 83. Since the pressure in the outer groove 83 and in the control groove 80 have opposite directions, no axial force components can act upon the control slider 66. The cross section of the throttle 78 is dimensioned so that with insignificantly untight seat valve 73, no pressur build up takes place in the control groove 80 of the control slider 66.

When the electromagnet 63 is energized, the control slider 66 moves against the spring force of the return spring 81 in FIG. 4 to the right. The seat valve 73 opens and the outlet chamber 75 is connected with the inlet chamber 76. The releasing seat cross section is large as compared with the cross section of the throttle 78, so that the total pressure difference between the plunger chamber 21 and the spring accumulator 24 builds on the throttle 78. The thus resulting axial force together with the magnetic force moves the control slider 66 very fast to its opening position. The valve passage from the annular groove 69 to the annular groove 70 and thereby from the valve inlet 61 to the valve outlet 62 is released.

Figure 6:
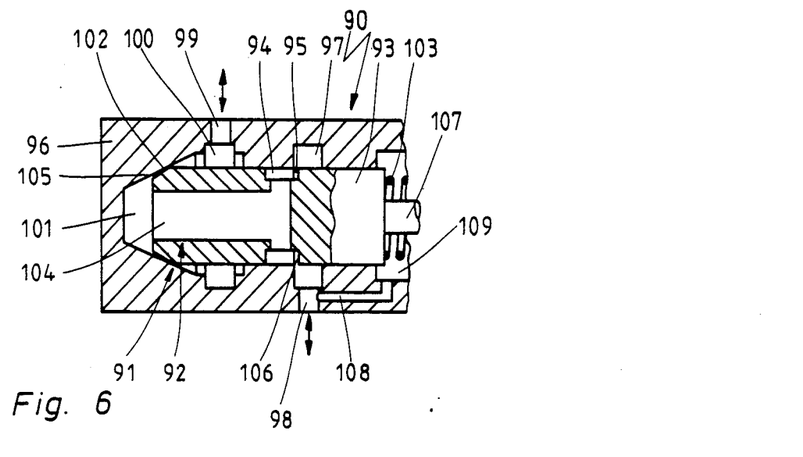
FIGS. 6–8 are views showing longitudinal sections of the valve control arrangement of FIG. 1 in accordance with three further embodiments.

An electromagnetic 2/2 directional control valve 90 shown in FIG. 6 is substantially a seat valve 91 whose valve member 92 is formed, however, a control slider 93. The control slider 93 cooperates with its outer groove 94 and its ring shaped pressing surface 95, with a ring shaped groove 97 which is arranged in the housing 96 of the seat valve 91 and coaxially surrounds the control slider 93. A valve inlet 99 is connected with a ring shaped groove which also coaxially surrounds in the housing 96 the control slider 93. A valve seat 102 is arranged between the inlet chamber 100 and an outlet chamber 101 provided at an end side on the control slider 93. The control slider 93 provided at its end side with a conical surface 105 abuts against the valve seat 102 under the action of a valve closing spring 103. The outlet chambre 101 is connectable with the ring shaped groove 97 and thereby with the valve outlet 98 via an axial openign 104 which has a large cross section and communicates with the outer groove 94 and the control slider 93. The outer groove 94 is formed so that with the closed seat valve 91 a slot opening 106 to the ring shaped chamber 97 opens and with the opened seat valve 91 the total width of the ring shaped chamber 97 is overlapped. The control slider 93 is coupled with an axially arranged not-shown electromagnet via an actuating rod 107. The right end side of the control slider 93 in FIG. 6 limits a pressure chamber 109 which is connected via an opening 105 in the housing 96 with the valve outlet 98. The operation of the above described 2/2 control valve 90 is as follows:

When the seat valve 91 is closed, the outlet chamber 101 and the inlet chamber 100 are separated from one another by the conical surface 105 of the control slider 93 which seats on the valve seat 102. The pressure of the pressure chamber 21 acts in the inlet chamber 100. With slightly untight seat valve 91 the leakage quantity flows via the gap opening 106 released from the outer groove 94 in the closed position of the seat valve 91, to the spring accumulator, so that on the control slider 93 an axially displacing force cannot form in direction of the valve opening. As long as the electromagnet is actuated, the control slider 93 displaces to the right in FIG. 6. The opening cross section of the seat valve increases proportionally, so that approximately pressure difference between pressure in the pressure chamber 21 and the pressure inthe spring accumulator 24 acts at the left hand side of the control slider 93. This pressure difference supports the opening movement of the control slider 93.

Figure 7:
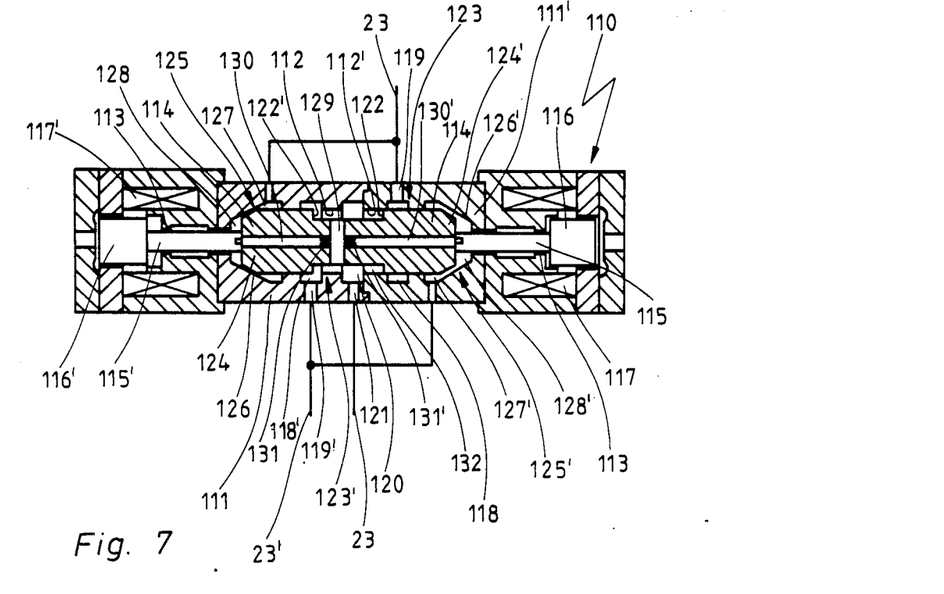

An electromagnetic 2/2 directional control valve 100 shown in FIG. 7 is formed substantially mirror-symmetrically so that the structural parts which are used twice are provided with the same reference numerals. The parts which are different are identified with reference numerals with primes. The valve housing is fomred of two parts, and both housing parts 111 and 111' abut against one another at the end side. Each housing part 111 or 111' has a housing opening 112 or 112' which is conically narrow at the bottom side and are open there to the other end side via outlet openings 113 or 113' of a smaller diameter. When the housing parts 111 and 111' abut against one another, the coaxial housing openings 112 and 112' form a guiding opening for a control slider 114. The end sides of the control slider are engaged by actuating rods 115 or 115' extending through the outlet openings 113 or 113' and connected with an armature 116 or 116' of an electromagnet 117 or 117'.

The housing opening 112 and 112' has in each housing part 111 or 111' a ring shaped groove 118 and 118' which is connected respectively with a valve inlet 119 or 119'. Moreover, a further ring shaped groove 120 in the housing opening 112 is provided with one housing part 111 and connected with a valve 121. The control slider 114 also carries at the periphery a very wide control groove 133 in an axial direction of the control slider 114. Both groove flanks of the control groove 132 are control edges 122 and 122' and cooperate with the ring shaped grooves 118 and 118' of the valve inlet 119 and 119'. The control slider 114 together with both valve inlets 119 and 119' and one valve outlet 121 form two longitudinal displacement valves 123 and 123'. Two pressure chambers 21 [FIG. 1] of two movement transmission groups 15 are connected at the inlet side with the longitudinal displacement valves 123 and 123', and a common spring accumulator 24 is connected with the same at the outlet side.

The control slider 115 carries at each end side a valve member 124 or 124' of a seat valve 125 or 125' with conical surfaces corresponding to the conical narrowing of the housing opening 112 or 112'. The valve member 124 or 124' operates in cooperation with a valve seat 126 or 126' which separate a ring shaped inlet chamber 127 or 127' arranged outwardly on the control slider 114 from an outlet chamber 128 or 128' arranged at the end side of the control slider 114.

The inlet chamber 127 or 127' is connected with the valve inlet 119 or 119'. The control slider 114 is provided substantially centrally with a transverse opening 129. Axial openings 130 and 130' which exit at the end side of the control slider 114 open into the transverse openign 129. A throttle 131 and 131' is arranged in axial openign 130 and 130'. The transverse opening 129 openings into the control groove 132 and thereby communicates always with the ring shaped groove 120 and also with the valve outlet 121. The electromagnets 117 and 117' are energized alternatingly and formed as pressure magnets, so that with energized magnets the associated longitudinal displacement valve 123 and 123' and the seat valve 125 and 125' are closed. The operation of the above described 2/2 directional control valve 110 is as follows:

When in FIG. 7 the right electromagnet 117 is energized, the control slider 114 is located in the position shown in FIG. 7 in which the longitudinal displacement valve 123 and the seat valve 25 are closed and the longitudinal displacement valve 123 and the seat valve 125 are open. When the electromagnet 117 is switched to be currentless and the electromagnet 117 is energized, the control slider 114 moves to its another end position in which the longitudinal displacement valve 123' and the seat valve 125' are closed and the longitudinal displacement valve 123 and the seat valve 125 are open. With the transfer of the control slider 114 from one of its both end positions, the pressure produced in the valve input 23 or 23' acts supported, so that the electromagnets, out with relatively small electrical power. In other aspects the operation of the longitudinal displacement valve 123 and 123' and the seat valve 125 and 125' with their associated structural elements in the closing and in the opening position, as well as transfer from one to the other end position is identical to the 2/2 directional control valve 60 in FIG. 4.

Figure 9:
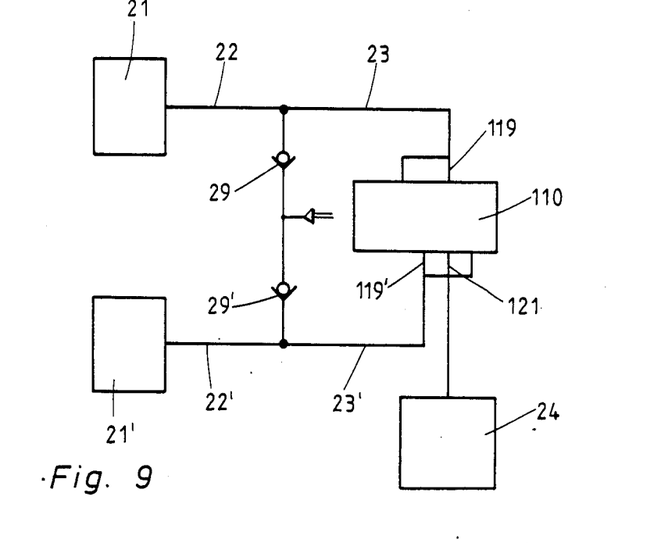
FIG. 9 is a view showing a switching diagram with hydraulic connections of the 2/2 directional control valve in accordance with FIG. 8 in the control arrangement of FIG. 1.

The hydraulic connection of the 2/2 directional valve 110 described in FIG. 7 into the valve control arrangement with two valves of an internal combustion engine with reciprocating pistons is shown in FIG. 9. A pressure chamber 21 of a movement transmission group 15 is connected via a conduit 22 which is formed as an opening with the unloading conduit 23. A pressure chamber 21' of a second movement transmission group 15' for a further valve of the internal combustion engine is connected similarly via a conduit 21' with the unloading conduit 23'. Both unloading conduits 23 and 23' are connected respectively with a valve inlet 119 or 119' of the 2/2 directional control valve 110. The valve outlet 121 is connected with the common spring accumulator 24. The conventionally used check valve which bridges conventionally the directional control valve 110 [identified with reference numeral 28 in FIG. 1] can be dispensed with. The conduit 22 and 22' are connected via check valves 29 and 29' with the matter of pressure or it will supply as in FIG. 1. The pressure chamber 21 and 21' on the 2/2 directional control valve 110 are closed by such movement transmission groups 15 or 15' which are associated with the inlet valves 14 and in the working cycle of an internal combustion engine do not directly follow one another.

Figure 8:
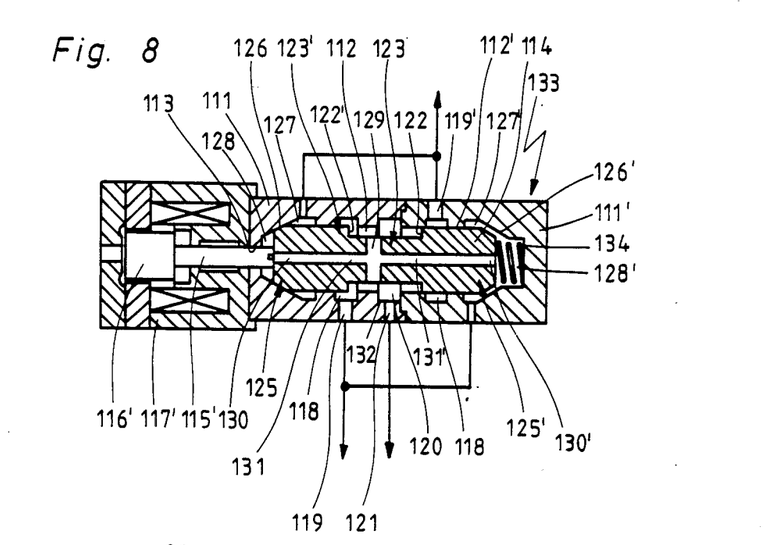

A 2/2 directional control valve 133 shown in FIG. 8 differs from the 2/2 directional control valve 110 shown in FIG. 7 only in that the electromagnet 117 is replaced by a pressured spring 134 which engages the same location, namely the end side of the control slider 114. Construction and operation of the 2/2 directional control valve 133 is in other aspects identical to those of the 2/2 directional control valve 110 in FIG. 7, so that the same parts are identified with same reference numerals.

The advantage of these both double-valve constructions lies in their small volumes. The 2/2 directional control valve 110 in FIG. 7 also has the advantage of low response time, since with the switching on of one electromagnet 115 or 115', the other electromagnet is switched off. It is therefore possible to use the energy of the switching magnets 115 and 115' for field information of the switching magnets 115' and 115. The control groove 132 is formed so that the control edges 122 and 122' have a negative overlap, so that in the event of current failure the control slider 114 assumes a central position in which both longitudinal displacement valves 123 and 123' are partially open and the respective pressure chambers 121 and 121' are connected with the spring accumulator 24. Opening of the inlet valve 111 of the internal combustion engine with reciprocating pistons is no longer possible, that is desired on safety grounds. The central position of the control slider 114 can also be obtained by weakly pretensioned pressure spings abutting against the end sides of the control slider 114.

It will be understood that each of the elements described above, or two or more together, may also find a useful application in other types of constructions differing from the types described above.

While the invention has been illustrated and described as embodied in a valve control arrangement for an internal combustion engine with reciprocating pistons, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A valve control arrangement for an internal combustion engine with reciprocating pistons, comprising a combustion chamber valve; a driving cam of said internal combustion chamber valve; a movement transmission group arranged between said combustion chamber valve and said driving cam and having a pressure chamber which is fillable with a pressure medium and unloadable from the pressure medium; an unloading conduit through which said pressure chamber is unloaded; and electrically controlled blocking valve arranged in said unloading conduit for blocking and releasing said unloading conduit and therefore coupling or uncoupling said combustion chamber valve relative to said driving cam, said blocking valve being formed as an electromagnetically controlled 2/2 directional control valve.

2. An arrangement as defined in claim 1; and further comprising a return accumulator connected with said unloading conduit, and a check valve overlapping said 2/2 directional control valve and having a blocking direction from said pressure chamber to said return accumulator.

3. An arrangement as defined in claim 1, wherein said 2/2 directional control valve has a pressure medium control longitudinal displacement valve having valve inlet and valve outlet and being connected by said valve inlet and said outlet in said unloading conduit, said longitudinal displacement valve having a control chamber and a control piston as well as a valve closing member, said 2/2 directional control valve further having an electromagnetic control which is connected with said control chamber of said longitudinal displacement valve; and further comprising a throttle arranged in said control piston of said longitudinal displacement valve and connecting said control chamber with said valve inlet.

4. An arrangement as defined in claim 3, wherein said control valve is formed as a seat valve having a valve inlet which is connected with said control chamber of said longitudinal displacement valve, and a valve outlet which is connected with said valve outlet of said longitudinal displacement valve.

5. An arrangement as defined in claim 3, wherein said control valve is formed as a seat valve having a valve inlet which is connected with said control chamber of said longitudinal displacement valve, and a valve outlet which is connected with a pressureless return opening.

6. An arrangement as defined in claim 3, wherein said control valve is formed as a seat valve having a valve inlet, a valve outlet, a valve member, and a valve seat cooperating with said valve member, said valve seat coaxially surrounding one of said valve inlet and valve outlet of said seat valve.

7. An arrangement as defined in claim 3, wherein said control valve is formed as a seat valve having a valve member, an electromagnetic with an armature, an actuating rod connecting said armature with said valve member, an armature chamber surrounding said armature and provided with a pressureless return opening for discharging leakage quantity of the pressure medium over a sliding guide of said actuating rod.

8. An arrangement as defined in claim 3, wherein said control piston is formed as a tandem piston and having a front piston part which faces toward said valve inlet of said longitudinal displacement valve and a rear piston part which carries a control edge cooperating with said valve outlet.

9. An arrangement as defined in claim 3, wherein said control piston is formed at its end side as a valve member of a seat valve which coperates with a valve seat arranged concentrically to said valve inlet.

10. An arrangement as defined in claim 1, wherein said 2/2 directional control valve has a valve inlet and a valve outlet and a longitudinal displacement valve arranged between said valve inlet and said valve outlet, and an electromagnet actuating said longitudinal displacement valve, said longitudinal displacement valve having a control slider with an end side provided with a control edge which is formed as a valve member of a seat valve, said seat valve having a valve seat cooperating with said valve member, said seat valve having an outlet chamber arranged before the end side of said control slider and an inlet chamber connected with said valve inlet, said valve seat separating said outlet chamber from said inlet chamber, and a throttle arranged so that said outlet chamber is connected with said valve outlet with interposition of said throttle.

11. An arrangement as defined in claim 10, wherein said seat valve has an axial opening which opens to the end side of said control slider, a radial opening connected with said axial opening and a ring shaped chamber surrounding said control slider and connected with said valve outlet, said outlet chamber being connected with said valve outlet via said axial opening and said radial opening, and said radial opening being connected with said ring shaped chamber.

12. An arrangement as defined in claim 11, wherein said seat valve has a further ring shaped chamber which surrounds said control slider and is connected with said valve inlet, said control slider having at its periphery a ring shaped control groove, said control groove having a groove flank which faces away of said seat valve and forms a control edge of said longitudinal displacement valve.

13. An arrangement as defined in claim 12, wherein said control slider in said ring chamber at its side facing away of said control groove is provided with a ring shaped outer groove, said outer groove being connected with said ring shaped chamber which is connected with said valve outlet.

14. An arrangement as defined in claim 10; and further comprising a pressure spring which acts in a valve closing direction and loads said control slider so that when electromagnet is not energized said control slider assumes a closing position which blocks said seat valve and said longitudinal displacement valve.

15. An arrangement as defined in claim 10, wherein said electromagnet is arranged in an axial direction of said control slider directly on the letter.

16. An arrangement as defined in claim 1, wherein said 2/2 directional control valve is formed as a seat valve with a valve member and a control slider which carries said valve member, and an axially arranged actuating magnet coupled with said control slider, said seat valve having a valve seat cooperating with said valve member, said seat valve having a valve inlet and a valve outlet, said seat valve also having an outlet chamber arranged before an end side of said control slider and an inlet chamber which surrounds said control slider and is connected with said valve inlet, said valve seat separating said outlet chamber from said inlet chamber, said seat valve further having an axial opening and a ring shaped chamber which surrounds said control slider and arranged so that said outlet chamber is connected with said ring shaped chamber via said axial opening and said ring shaped chamber is connected with said valve outlet.

17. An arrangement as defined in claim 1, wherein said control slider has a ring shaped outer groove which is connected with said axial opening, said outer groove being formed so that in the closed position of said control slider a gap opening is formed between said outer groove and said ring shaped chamber and in the open position of said control slider said outer groove overlaps the width of said ring shaped chamber, and said control slider being provided at its end slide facing away of said seat valve with a pressure chamber connected with said valve outlet.

18. An arrangement as defined in claim 1, wherein said 2/2 directional control valve has two valve inlets and two valve outlets and two longitudinal displacement valves each arranged between one of said valve inlets and one of said valve outlets and having a common control slider, an electromagnet actuating said common control slider, said control slider having two control edges for a respective one of said longitudinal displacement valves, said control slider being formed at each end side as a valve member of a seat valve and cooperates with a valve seat, said longitudinal displacement valve has two outlet chambers each arranged before a respective one of the end sides of said control slider and two inlet chambers each connected with a respective one of said valve inlets, said valve seat separating said outlet chambers from said inlet chambers, and two throttles arranged so that said outlet chambers being connected with said valve outlet through said throttles respectively.

19. An arrangement as defined in claim 18, wherein said longitudinal displacement valve has two axial openings each opening at the end side of said control slider, at least one radial opening connected with said axial openings, and a ring chamber surrounding said control slider, said outlet chambers being connected with said valve outlet via said axial opening and via said radial opening, said radial opening being connected with said ring shaped chamber in each displacement position of said control slider, and said ring shaped chamber being connected with said valve outlet.

20. An arrangement as defined in claim 19, wherein said longitudinal displacement valve further has two ring shaped chambers respectively connected with said inlets and surrounding said control chamber at both sides of said first ring shaped chamber, said control slider being provided at its periphery with a ring shaped control groove with one groove flank cooperating with one of said ring shaped chambers and another groove flank operating with the other of said ring shaped chambers and forming said control edges of said longitudinal displacement valves respectively.

21. An arrangement as defined in claim 18; and further comprising an axial plunger and a pressure spring arranged so that said actuating magnet engages one end side of said control slider via said axial plunger, and said pressure spring abuts against the other end side of said control slider.

22. An arrangement as defined in claim 18; and further comprising a second such actuating magent, and two axial plungers arranged so that said two actuating members engage the end sides of said control slider via said axial plungers respectively and said actuating magnets are energizable alternatingly.

23. An arrangement as defined in claim 22, wherein said actuating magnets are formed as pressing magnets.

24. An arrangement as defined in claim 20, wherein said control groove is dimensioned so that said groove flanks which form said control edges provide a negative overlapping relative to said further ring shaped chambers.

* * * * *